United States Patent
Jang

(10) Patent No.: US 10,086,824 B2
(45) Date of Patent: *Oct. 2, 2018

(54) METHOD AND APPARATUS OF DETERMINING PERFORMANCE FOR BATTERY FOR MILD HYBRID ELECTRIC VEHICLE

(71) Applicant: Hyundai Motor Company, Seoul (KR)

(72) Inventor: Hwa Yong Jang, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 30 days.

This patent is subject to a terminal disclaimer.

(21) Appl. No.: 15/341,268

(22) Filed: Nov. 2, 2016

(65) Prior Publication Data
US 2018/0022341 A1    Jan. 25, 2018

(30) Foreign Application Priority Data
Jul. 19, 2016 (KR) .................. 10-2016-0091600

(51) Int. Cl.
| | |
|---|---|
| *B60W 20/15* | (2016.01) |
| *B60W 20/14* | (2016.01) |
| *B60T 8/172* | (2006.01) |
| *B60L 11/18* | (2006.01) |
| *B60T 11/10* | (2006.01) |

(52) U.S. Cl.
CPC .......... *B60W 20/14* (2016.01); *B60L 11/1809* (2013.01); *B60L 11/1862* (2013.01);
(Continued)

(58) Field of Classification Search
CPC ...... B60W 20/14; B60W 30/02; B60W 20/10; B60W 20/15; B60L 11/1809;
(Continued)

(56) References Cited

U.S. PATENT DOCUMENTS

| | | | | |
|---|---|---|---|---|
| 8,002,058 | B2 * | 8/2011 | Ishikawa ............... | B60W 30/02 180/65.21 |
| 8,332,116 | B2 * | 12/2012 | Takiguchi ............ | B60K 26/021 180/65.265 |

(Continued)

FOREIGN PATENT DOCUMENTS

| | | |
|---|---|---|
| JP | 2005-037230 A | 2/2005 |
| KR | 10-2004-0003278 A | 1/2004 |

(Continued)

OTHER PUBLICATIONS

Fayazi et al., Power delivery co-ordination to meet driver's demand in a mild hybrid vehicle with automated manual transmission, 2008, IEEE, p. 327-332.*

(Continued)

*Primary Examiner* — McDieunel Marc
(74) *Attorney, Agent, or Firm* — Morgan, Lewis & Bockius LLP

(57) ABSTRACT

A method for determining performance of a battery for a mild hybrid electric vehicle may include detecting a speed of the mild hybrid electric vehicle, a position value of an accelerator pedal, a position value of a brake pedal, and a state of charge (SOC) of the battery, determining whether a regenerative braking condition is satisfied, determining a demand braking amount of a driver, determining a regenerative braking allowance, operating a mild hybrid starter and generator (MHSG) to generate regenerative braking torque corresponding to the regenerative braking allowance, determining a target SOC increment amount, determining an actual SOC increment amount, and determining that the performance of the battery is deteriorated when a difference in value between the target SOC increment amount and the actual SOC increment amount is equal to or greater than a reference value.

10 Claims, 3 Drawing Sheets

(52) U.S. Cl.
CPC ............... *B60T 8/172* (2013.01); *B60T 11/10* (2013.01); *B60L 2250/16* (2013.01); *B60T 2270/60* (2013.01); *B60Y 2300/18125* (2013.01); *B60Y 2300/91* (2013.01); *B60Y 2400/112* (2013.01); *B60Y 2400/81* (2013.01); *Y10S 903/947* (2013.01)

(58) Field of Classification Search
CPC .. B60L 11/1862; B60L 2250/16; B60T 8/172; B60T 11/10; B60T 2270/60; B60Y 2300/18125; B60Y 2300/91; B60Y 2400/112; B60Y 2400/81; Y10S 903/947; B60K 6/445; B60K 6/485; F02D 41/065
USPC .......................................................... 701/22
See application file for complete search history.

(56) References Cited

U.S. PATENT DOCUMENTS

| | | | |
|---|---|---|---|
| 8,880,254 B2 * | 11/2014 | Choi | B60W 30/192 |
| | | | 123/375 |
| 9,132,831 B2 * | 9/2015 | Hoshiba | B60K 6/445 |
| 9,216,639 B2 * | 12/2015 | Yamamoto | F02D 41/065 |
| 9,481,363 B2 * | 11/2016 | Poertner | B60K 6/485 |
| 2017/0158185 A1 * | 6/2017 | Kim | B60K 25/02 |
| 2017/0291594 A1 * | 10/2017 | Kim | B60W 20/10 |
| 2017/0305409 A1 * | 10/2017 | Kim | B60W 20/15 |

FOREIGN PATENT DOCUMENTS

| | | |
|---|---|---|
| KR | 10-0906872 B1 | 1/2009 |
| KR | 10-2009-0042367 A | 4/2009 |
| KR | 10-2012-0046355 A | 5/2012 |
| KR | 10-2013-0090679 A | 8/2013 |
| KR | 10-2015-0108512 A | 9/2015 |

OTHER PUBLICATIONS

Liang et al., Study of the electronic control strategy for the power train of hybrid electric vehicle, 1999, IEEE, p. 383-386.*
Cikanek et al., Regenerative braking system for a hybrid electric vehicle, 2002, IEEE, p. 3129-3134.*
Shuang et al., Power Management Strategy with Regenerative Braking for Fuel Cell Hybrid Electric Vehicle, 2009, IEEE, p. 1-4.*

* cited by examiner

METHOD AND APPARATUS OF DETERMINING PERFORMANCE FOR BATTERY FOR MILD HYBRID ELECTRIC VEHICLE

CROSS-REFERENCE TO RELATED APPLICATION

The present application claims priority to Korean Patent Application No. 10-2016-0091600, filed Jul. 19, 2016, the entire contents of which is incorporated herein for all purposes by this reference.

BACKGROUND OF THE INVENTION

Field of the Invention

The present invention relates to a method and an apparatus for determining performance of a battery for a mild hybrid electric vehicle. More particularly, to a method and an apparatus for determining performance of a battery for a mild hybrid electric vehicle that is capable of determining whether performance of the battery is deteriorated.

Description of Related Art

As is generally known in the art, a hybrid electric vehicle uses an internal combustion engine and a battery power source together. The hybrid electric vehicle efficiently combines torque of the internal combustion engine and torque of a motor.

Hybrid electric vehicles may be divided into a hard type and a mild type according to a power sharing ratio between an engine and a motor. In case of the mild type of hybrid electric vehicle (hereinafter referred to as a mild hybrid electric vehicle), a mild hybrid starter and generator (MHSG) configured to start the engine or generate electricity according to an output of the engine is used instead of an alternator. In the case of the hard type of hybrid electric vehicle, a driving motor for generating driving torque is used in addition to an integrated starter and generator (ISG) configured to start the engine or generate electricity.

The mild hybrid electric vehicle does not provide a driving mode in which torque of the MHSG is used as main driving torque, but the MHSG may assist torque of the engine according to running states of the vehicle and may charge a battery (e.g., a 48 V battery) through regenerative braking. Accordingly, fuel efficiency of the mild hybrid electric vehicle may be improved.

As the battery which supplies electricity to the MHSG and is charged with electricity recovered through the MHSG, an absorptive glass mat (AGM) battery or a lithium-ion battery is used. In other words, the battery having fast charging/discharging speed and improved durability is used to achieve optimum performance of the MHSG. If a lead-acid battery used for a gasoline vehicle or a diesel vehicle is used for operating the MHSG, it is difficult to maximize the performance of the mild hybrid electric vehicle.

Accordingly, when the AGM battery or the lithium-ion battery applied to the mild hybrid electric vehicle is replaced with a low-priced battery such as a lead-acid battery by a mistake or carelessness of a mechanic or the performance of the battery is deteriorated, it is required to inform a driver of necessity of maintenance.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a method and an apparatus for determining performance of a battery for a mild hybrid electric vehicle having advantages of determining whether performance of the battery is deteriorated.

According to various aspects of the present invention, a method for determining performance of a battery for a mild hybrid electric vehicle may include detecting, by a data detector, a speed of the mild hybrid electric vehicle, a position value of an accelerator pedal, a position value of a brake pedal, and a state of charge (SOC) of the battery, determining, by a controller, whether a regenerative braking condition is satisfied based on the speed of the mild hybrid electric vehicle, the position value of the accelerator pedal, and the position value of the brake pedal, determining, by the controller, a demand braking amount of a driver based on the speed of the mild hybrid electric vehicle and the position value of the brake pedal when the regenerative braking condition is satisfied, determining, by the controller, a regenerative braking allowance based on the demand braking amount of the driver and the SOC of the battery, operating, by the controller, a mild hybrid starter and generator (MHSG) to generate regenerative braking torque corresponding to the regenerative braking allowance, determining, by the controller, a target SOC increment amount corresponding to the regenerative braking allowance, determining, by the controller, an actual SOC increment amount based on the SOC of the battery, and determining, by the controller, that the performance of the battery is deteriorated when a difference in value between the target SOC increment amount and the actual SOC increment amount is equal to or greater than a reference value.

The regenerative braking condition may be satisfied when the speed of the mild hybrid electric vehicle is greater than a predetermined speed, the position value of the accelerator pedal is a predetermined position value, and the position value of the brake pedal is greater than the predetermined position value.

The method may further include determining, by the controller, a friction braking amount based on the demand braking amount of the driver and the regenerative braking allowance, and operating, by the controller, a hydraulic pressure actuator to cause a wheel cylinder to generate friction braking force corresponding to the friction braking amount.

The method may further include operating, by the controller, a display device to display a warning lamp or warning message when it is determined that the performance of the battery is deteriorated.

The battery may be an absorptive glass mat (AGM) battery and a lithium-ion battery.

According to various aspects of the present invention, an apparatus for determining performance of a battery for a mild hybrid electric vehicle may include a mild hybrid starter and generator engine (MHSG) for starting an engine or generating electricity according to an output of the engine, a battery supplying electricity to the MHSG and charged with electricity recovered through the MHSG, a vehicle speed sensor for detecting a speed of the mild hybrid electric vehicle, an accelerator pedal position sensor for detecting a position value of an accelerator pedal, a brake pedal position sensor for detecting a position value of a brake pedal, a state of charge (SOC) sensor for detecting an SOC of the battery, and a controller for determining performance of the battery based on the speed of the mild hybrid electric vehicle, the position value of the accelerator pedal, the position value of the brake pedal, and the SOC of the battery, in which the controller may determine a demand braking amount of a driver when a regenerative braking condition is satisfied, determine a regenerative braking allowance based on the demand braking amount of the driver and the SOC of the battery, operate the MHSG to generate regenerative braking torque corresponding to the regenerative braking allowance, determine a target SOC increment amount corresponding to the regenerative braking allowance, determine an actual SOC increment amount based on the SOC of the battery, and determine that the performance of the battery is deteriorated when a difference value between the target SOC increment amount and the actual SOC increment amount is equal to or greater than a reference value.

The controller may calculate a friction braking amount based on the demand braking amount of the driver and the regenerative braking allowance, and operate a hydraulic pressure actuator to cause a wheel cylinder to generate friction braking force corresponding to the friction braking amount.

The apparatus may further include a display device displaying information processed by the controller, in which the controller may operate the display device to display a warning lamp or warning message when it is determined that the performance of the battery is deteriorated.

According to various embodiments of the present invention, it is possible to determine whether performance of the battery is deteriorated. Accordingly, when performance of the battery is deteriorated or the battery is replaced with a low-priced battery such as a lead-acid battery, the driver may recognize necessity of maintenance through the warning lamp or the warning message.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
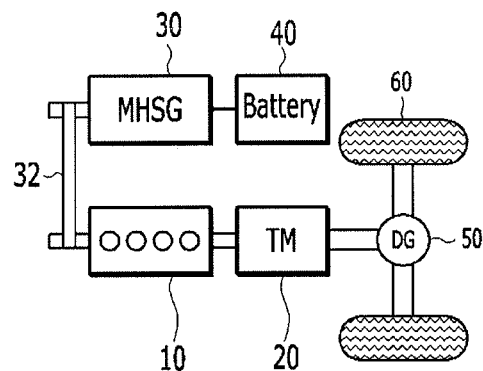
FIG. 1 is a block diagram of a mild hybrid electric vehicle according to various embodiments of the present invention.

FIG. 1 is a block diagram of a mild hybrid electric vehicle according to various embodiments of the present invention.

As shown in FIG. 1, a mild hybrid electric vehicle according to various embodiments of the present invention may include an engine 10, a transmission 20, a mild hybrid starter and generator (MHSG) 30, a battery 40, a differential gear apparatus 50, and a wheel 60.

The engine 10 combusts fuel to generate torque, and various engines such as a gasoline engine, a diesel engine, and a liquefied petroleum injection (LPI) engine may be used as the engine 10.

In connection with torque transmission of the mild hybrid electric vehicle, torque generated from the engine 10 is transmitted to an input shaft of the transmission 20, and torque output from an output shaft of the transmission 20 is transmitted to an axle via the differential gear apparatus 50. The axle rotates the wheel 60 such that the mild hybrid electric vehicle runs by the torque generated from the engine 10.

The MHSG 30 converts electrical energy into mechanical energy or converts mechanical energy into electrical energy. In other words, the MHSG 30 starts the engine 10 or generates electricity according to an output of the engine 10. In addition, the MHSG 30 may contribute to the torque of the engine 10. The torque of the engine 10 may be used as main torque, and torque of the MHSG 30 may be used as auxiliary torque. The engine 10 and the MHSG 30 may be connected to each other through a belt 32.

The battery 40 may supply electricity to the MHSG 30, and may be charged with electricity recovered through the MHSG 30 in a regenerative braking mode. The battery 40 is a high voltage battery (e.g., a 48 V battery), and may be absorptive glass mat (AGM) battery or a lithium-ion battery. The mild hybrid electric vehicle may further include a low voltage DC-DC converter (LDC) converting a voltage supplied from the battery 40 into a low voltage, and a low voltage battery (e.g., a 12 V battery) supplying a low voltage to an electrical load (e.g., a headlamp, an air conditioner, and a wiper).

Figure 2:
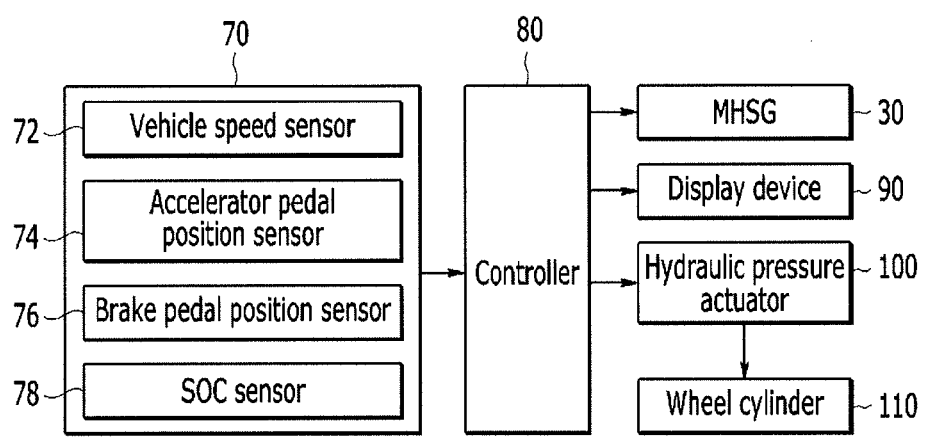
FIG. 2 is a block diagram of an apparatus for determining performance of a battery for a mild hybrid electric vehicle according to various embodiments of the present invention.

FIG. 2 is a block diagram of an apparatus for determining performance of a battery for a mild hybrid electric vehicle according to various embodiments of the present invention.

As shown in FIG. 2, an apparatus for determining performance of a battery for a mild hybrid electric vehicle according to various embodiments of the present invention may include a data detector 70, a controller 80, the MHSG 30, a display device 90, a hydraulic pressure actuator 100, and a wheel cylinder 110.

The data detector 70 detects data for determining performance of the battery 40, and the data detected by the data detector 80 is transmitted to the controller 80. The data detector 70 may include a vehicle speed sensor 72, an accelerator pedal position sensor 74, a brake pedal position sensor 76, and a state of charge (SOC) sensor 78.

The vehicle speed sensor 72 detects a speed of the mild hybrid electric vehicle, and transmits a signal corresponding thereto to the controller 80.

The accelerator pedal position sensor 74 detects a position value of an accelerator pedal (i.e., a pushed degree of the accelerator pedal), and transmits a signal corresponding thereto to the controller 80. When the accelerator pedal is pushed fully, the position value of the accelerator pedal is 100%, and when the accelerator pedal is not pushed, the position value of the accelerator pedal is 0%.

The brake pedal position sensor 76 detects a position value of a brake pedal (i.e., a pushed degree of the brake pedal), and transmits a signal corresponding thereto to the controller 80. When the brake pedal is pushed fully, the position value of the brake pedal is 100%, and when the brake pedal is not pushed, the position value of the brake pedal is 0%.

The SOC sensor 78 detects the state of charge (SOC) of the battery 40, and transmits a signal corresponding thereto to the controller 80. Instead of directly detecting the SOC of the battery 40, a current and a voltage of the battery 40 may be measured to estimate the SOC of the battery 40.

The controller 80 may determine performance of the battery 40 based on data detected by the data detector 70. The controller 80 may be implemented by one or more processors executed by a predetermined program. The predetermined program may include a series of commands for performing each step included in a method for determining performance of a battery for a mild hybrid electric vehicle according to various embodiments of the present invention.

The display device 90 displays information processed by the controller 80. The display device 90 may be a component of a cluster device or an audio-video-navigation (AVN) device.

The hydraulic pressure actuator 100 receives a control signal from the controller 80, and controls hydraulic pressure applied to the wheel cylinder 110. The hydraulic pressure actuator 100 may include at least one of control valves and solenoid valves that control hydraulic pressures applied to the wheel cylinder 110.

The wheel cylinder 110 is mounted at the wheel 60, and is operated depending on hydraulic pressure supplied from the hydraulic pressure actuator 100 to provide friction braking force to the vehicle.

Figure 3:
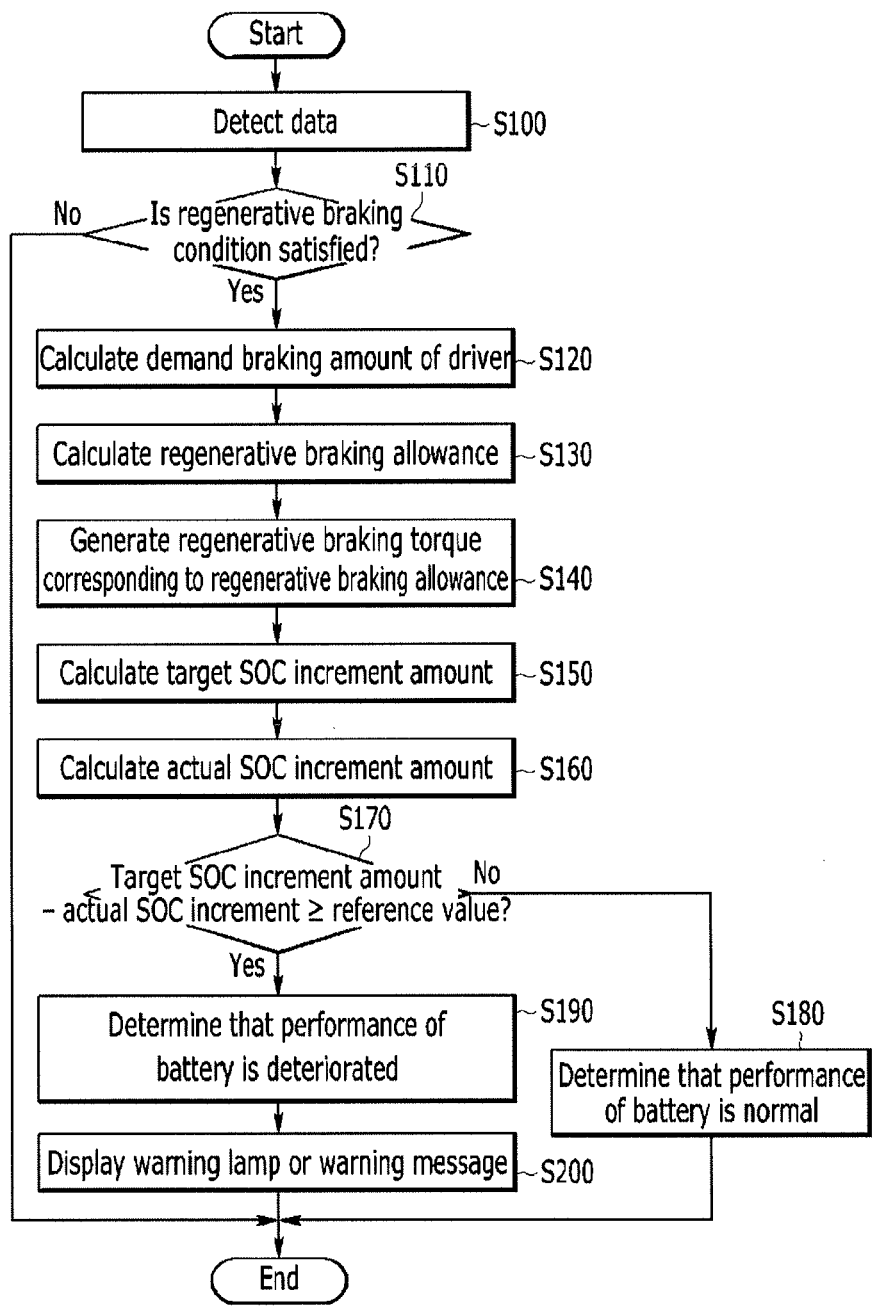
FIG. 3 is a flowchart of a method for determining performance of a battery for a mild hybrid electric vehicle according to various embodiments of the present invention.

FIG. 3 is flowchart of a method for determining performance of a battery for a mild hybrid electric vehicle.

As shown in FIG. 3, a method for determining performance of a battery for a mild hybrid electric vehicle according to various embodiments of the present invention may begin with detecting data for determining the performance of the battery 40 at step S100. The vehicle speed sensor 72 detects the speed of the mild hybrid electric vehicle, the accelerator pedal position sensor 74 detects the position value of the accelerator pedal, the brake pedal position sensor 76 detects the position value of the brake pedal, and the SOC sensor 78 detects the SOC of the battery 40.

The controller 80 determines whether a regenerative braking condition is satisfied based on the detected data at step S110. In other words, the controller 80 may determine whether the regenerative braking condition is satisfied based on the speed of the mild hybrid electric vehicle, the position value of the accelerator pedal, and the position value of the brake pedal. For example, the regenerative braking condition may be satisfied when the speed of the mild hybrid electric vehicle is greater than a predetermined speed, the position value of the accelerator pedal is 0%, and the position value of the brake pedal is greater than 0%.

When the regenerative braking condition is not satisfied at step S110, the controller 80 may terminate the method for determining the performance of the battery 40 for the mild hybrid electric vehicle according to various embodiments of the present invention.

When the regenerative braking condition is satisfied at step S110, the controller 80 calculates a demand braking amount of a driver based on the speed of the mild hybrid electric vehicle and the position value of the brake pedal at step S120.

The controller 80 calculates a regenerative braking allowance based on the demand braking amount and the SOC of the battery 40 at step S130. As the SOC of the battery 40 decreases, the regenerative braking allowance may increase, and as the SOC of the battery 40 increases, the regenerative braking allowance may decrease.

The controller 80 operates the MHSG 30 to generate regenerative braking torque that corresponds to the regenerative braking allowance at step S140. The SOC of the battery 40 increases according to the operation of the MHSG 30. In addition, the controller 80 may calculate a friction braking amount based on the demand braking amount of the driver and the regenerative braking allowance. The friction braking amount is a value obtained by subtracting the regenerative braking allowance from the demand braking amount of the driver. The controller 80 operates the hydraulic pressure actuator 100 to cause the wheel cylinder 110 to generate friction braking force that corresponds to the friction braking amount. As a result, the demand braking amount of the driver may be satisfied.

The controller 80 calculates a target SOC increment amount that corresponds to the regenerative braking allowance at step S150. In other words, the controller 80 may estimate or calculate how much the SOC of the battery 40 is increased by the operation of the MHSG 30. The target SOC increment amount that corresponds to the regenerative braking allowance may be previously determined by experimentation.

The controller 80 calculates an actual SOC increment amount based on the signal of the SOC sensor 78 at step S160. In other words, the controller 80 may calculate an SOC amount that is actually increased during regenerative braking of the mild hybrid electric vehicle based on the SOC of the battery 40.

The controller 80 compares a difference in value between the target SOC increment amount and the actual SOC increment amount with a reference value at step S170. The reference value may be set by a person of ordinary skill in the art considering performance of the battery 40.

When the difference in value is less than the reference value at step S170, the controller 80 determines that the performance of the battery 40 is normal at step S180.

When the difference value is equal to or greater than the reference value at step S170, the controller 80 determines that the performance of the battery 40 is deteriorated at step S190. In this case, the controller 80 may operate the display device 90 to display a warning lamp or warning message indicating that the performance of the battery 40 is deteriorated.

As described above, according to various embodiments of the present invention, it is possible to determine whether performance of the battery 40 is deteriorated. Accordingly, when performance of the battery 40 is deteriorated or the battery 40 is replaced with a low-priced battery such as a lead-acid battery, the driver may recognize necessity of maintenance through the warning lamp or the warning message.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method for determining performance of a battery for a mild hybrid electric vehicle, the method comprising:
   detecting, by a data detector, a speed of the mild hybrid electric vehicle, a position value of an accelerator pedal, a position value of a brake pedal, and a state of charge (SOC) of the battery;
   determining, by a controller, whether a regenerative braking condition is satisfied based on the speed of the mild hybrid electric vehicle, the position value of the accelerator pedal, and the position value of the brake pedal;
   determining, by the controller, a demand braking amount of a driver based on the speed of the mild hybrid electric vehicle and the position value of the brake pedal when the regenerative braking condition is satisfied;
   determining, by the controller, a regenerative braking allowance based on the demand braking amount of the driver and the SOC of the battery;
   operating, by the controller, a mild hybrid starter and generator (MHSG) to generate regenerative braking torque corresponding to the regenerative braking allowance;
   determining, by the controller, a target SOC increment amount corresponding to the regenerative braking allowance;
   determining, by the controller, an actual SOC increment amount based on the SOC of the battery; and
   determining, by the controller, that the performance of the battery is deteriorated when a difference in value between the target SOC increment amount and the actual SOC increment amount, is equal to or greater than a reference value.

2. The method of claim 1, wherein the regenerative braking condition is satisfied when the speed of the mild hybrid electric vehicle is greater than a predetermined speed, the position value of the accelerator pedal is a predetermined position value, and the position value of the brake pedal is greater than a predetermined position value.

3. The method of claim 1, further comprising:
   determining, by the controller, a friction braking amount based on the demand braking amount of the driver and the regenerative braking allowance; and
   operating, by the controller, a hydraulic pressure actuator to cause a wheel cylinder to generate friction braking force corresponding to the friction braking amount.

4. The method of claim 1, further comprising operating, by the controller, a display device to display a warning lamp or warning message when the performance of the battery is determined to be deteriorated.

5. The method of claim 1, wherein the battery is an absorptive glass mat (AGM) battery and a lithium-ion battery.

6. An apparatus for determining performance of a battery for a mild hybrid electric vehicle, the apparatus comprising:
   a mild hybrid starter and generator engine (MHSG) for starting an engine or generating electricity according to an output of the engine;
   a battery supplying electricity to the MHSG and charged with electricity recovered through the MHSG;
   a vehicle speed sensor for detecting a speed of the mild hybrid electric vehicle;
   an accelerator pedal position sensor for detecting a position value of an accelerator pedal;
   a brake pedal position sensor for detecting a position value of a brake pedal;
   a state of charge (SOC) sensor for detecting an SOC of the battery; and
   a controller for determining performance of the battery based on the speed of the mild hybrid electric vehicle, the position value of the accelerator pedal, the position value of the brake pedal, and the SOC of the battery,
   wherein the controller determines a demand braking amount of a driver when a regenerative braking condition is satisfied, determines a regenerative braking allowance based on the demand braking amount of the driver and the SOC of the battery, operates the MHSG to generate regenerative braking torque corresponding to the regenerative braking allowance, determines a target SOC increment amount corresponding to the regenerative braking allowance, determines an actual SOC increment amount based on the SOC of the battery, and determines that the performance of the battery is deteriorated when a difference value between the target SOC increment amount and the actual SOC increment amount is equal to or greater than a reference value.

7. The apparatus of claim 6, wherein the regenerative braking condition is satisfied when the speed of the mild hybrid electric vehicle is greater than a predetermined speed, the position value of the accelerator pedal is a predetermined position value, and the position value of the brake pedal is greater than a predetermined position value.

8. The apparatus of claim 6, wherein the controller determines a friction braking amount based on the demand braking amount of the driver and the regenerative braking allowance, and operates a hydraulic pressure actuator to cause a wheel cylinder to generate friction braking force corresponding to the friction braking amount.

9. The apparatus of claim 6, further comprising a display device displaying information processed by the controller, wherein the controller operates the display device to display a warning lamp or warning message when the performance of the battery is determined to be deteriorated.

10. The apparatus of claim 6, wherein the battery is an absorptive glass mat (AGM) battery and a lithium-ion battery.

\* \* \* \* \*